(12) United States Patent  
Fang et al.

(10) Patent No.: US 9,038,348 B1  
(45) Date of Patent: May 26, 2015

(54) LATTICE TOWER ASSEMBLY FOR A WIND TURBINE

(71) Applicant: General Electric Company, Schenectady, NY (US)

(72) Inventors: Biao Fang, Clifton Park, NY (US); Robert Allan Phelps, Salt Lake City, UT (US); David Drue Oliphant, West Jordan, UT (US); William Clark Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/132,622

(22) Filed: Dec. 18, 2013

(51) Int. Cl.  
*F03D 11/04* (2006.01)  
*E04H 12/10* (2006.01)

(52) U.S. Cl.  
CPC ......... *F03D 11/04* (2013.01); *F05B 2240/9121* (2013.01); *E04H 12/10* (2013.01)

(58) Field of Classification Search  
CPC .............. E04H 12/10; E04H 2012/006; F05B 2240/9121; F03D 11/04  
USPC ................. 52/651.01, 651.07, 651.11, 654.1, 52/653.1, 667, 660, 664, 834, 63, 222, 52/273; 135/115, 119  
See application file for complete search history.

(56) References Cited

U.S. PATENT DOCUMENTS

| | | | | |
|---|---|---|---|---|
| 1,617,262 | A * | 2/1927 | Malone ....................... | 52/651.11 |
| D84,905 | S * | 8/1931 | Tate .......................... | D10/109.1 |
| 2,246,151 | A * | 6/1941 | Vrooman ..................... | 343/843 |
| 2,593,714 | A * | 4/1952 | Robinson ...................... | 156/156 |
| 3,062,335 | A * | 11/1962 | Baxter ............................. | 52/222 |
| 3,371,458 | A * | 3/1968 | Sturgill ....................... | 52/651.01 |
| 4,069,626 | A * | 1/1978 | Schuette ........................... | 52/57 |
| 4,253,288 | A * | 3/1981 | Chun ............................ | 52/454 |
| 4,311,434 | A * | 1/1982 | Abe ............................. | 416/142 |
| 4,938,243 | A * | 7/1990 | Foster .......................... | 135/136 |
| 5,375,353 | A * | 12/1994 | Hulse .............................. | 40/217 |
| 5,642,966 | A * | 7/1997 | Morrison et al. .......... | 405/195.1 |
| 6,299,384 | B1 * | 10/2001 | Glasscock et al. ............ | 405/227 |
| 6,644,893 | B2 * | 11/2003 | Johnson ........................ | 405/209 |
| 7,877,934 | B2 * | 2/2011 | Livingston et al. ............... | 52/40 |

(Continued)

FOREIGN PATENT DOCUMENTS

EP 2239398 10/2010  
WO WO 2004/094819 11/2004

OTHER PUBLICATIONS http://www.ice.org.uk/nearyou/UK-Regions/London/ICE-London-Civil-Engineering-Awards/2013-awards-and-short-list/Sky-wind-turbine.

*Primary Examiner* — Brent W Herring  
(74) *Attorney, Agent, or Firm* — Dority & Manning, P.A.

(57) ABSTRACT

The present subject matter is directed to a lattice tower covering and/or assembly for a wind turbine. The lattice tower assembly includes a plurality of structural members connected together to define an open lattice tower. The structural members include a plurality of supports, a plurality of inner cross-support members, and a plurality of outer cross-support members. The inner and outer cross-support members are connected between the supports so as to define one or more openings. The lattice tower covering includes one or more panel elements. Each of the panel elements are retained in position between the supports and cover at least a portion of one or more of the openings. Further, the lattice tower covering has a surface area defined by the plurality of supports and the one or more panel elements.

8 Claims, 6 Drawing Sheets

(56) References Cited

U.S. PATENT DOCUMENTS

| | | | |
|---|---|---|---|
| 8,069,634 B2* | 12/2011 | Livingston et al. | 52/745.17 |
| 8,136,329 B2 | 3/2012 | Willis | |
| 8,393,118 B2* | 3/2013 | Fang et al. | 52/167.1 |
| 8,572,926 B2 | 11/2013 | Vangsy et al. | |
| 2002/0104284 A1* | 8/2002 | Katsura | 52/664 |
| 2005/0055953 A1* | 3/2005 | Sacks et al. | 52/633 |
| 2005/0166521 A1* | 8/2005 | Silber | 52/633 |
| 2006/0213145 A1 | 9/2006 | Haller | |
| 2007/0151194 A1 | 7/2007 | Livingston et al. | |
| 2008/0078128 A1 | 4/2008 | Livingston et al. | |
| 2008/0080946 A1 | 4/2008 | Livingston et al. | |
| 2010/0236161 A1 | 9/2010 | Livingston et al. | |
| 2011/0126488 A1* | 6/2011 | Hedinger et al. | 52/651.09 |
| 2012/0023860 A1* | 2/2012 | Voss | 52/651.09 |
| 2014/0245671 A1* | 9/2014 | Sritharan et al. | 52/173.1 |

* cited by examiner

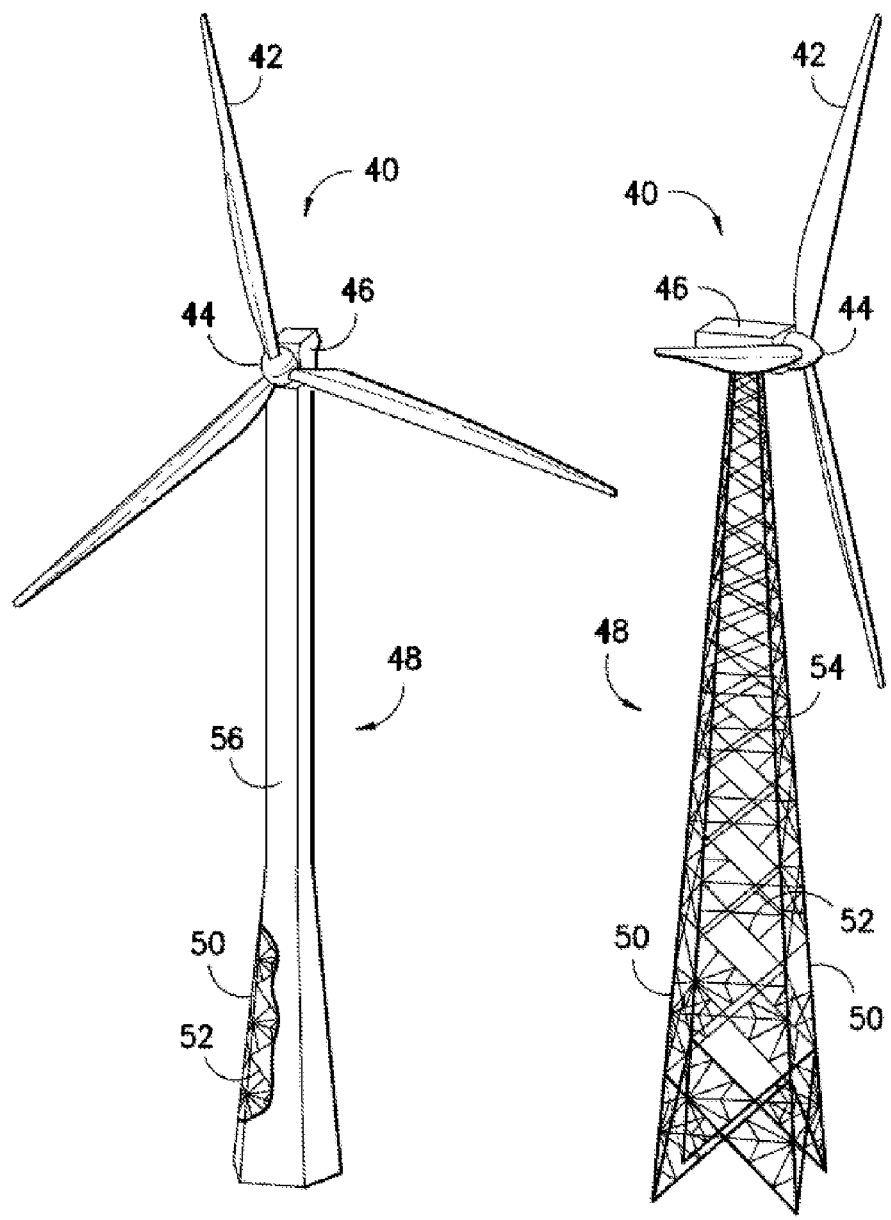
FIG. -1-
(PRIOR ART)
FIG. -2-
(PRIOR ART)

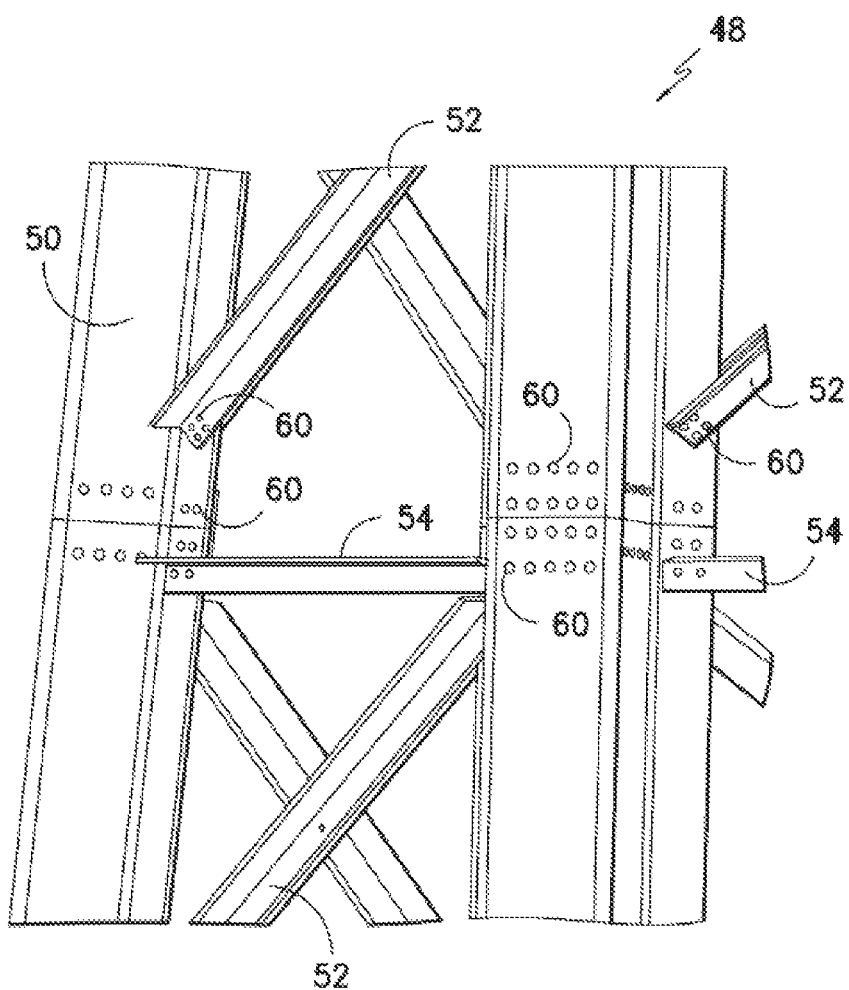
FIG. -3-
(PRIOR ART)

LATTICE TOWER ASSEMBLY FOR A WIND TURBINE

FIELD OF THE INVENTION

The present invention relates generally to wind turbines, and more particularly to an improved lattice tower covering for a wind turbine.

BACKGROUND OF THE INVENTION

Conventional wind turbine towers typically include a tubular pole or a lattice structure to support a wind turbine at a considerable height to capture wind energy. The tubular pole configuration is relatively more simple and easier to assemble than the lattice structure. However, tubular poles use more steel than the lattice structure, resulting in a cost disadvantage with rising prices of steel.

Thus, lattice tower structures can have potential as an alternative to the tubular poles, especially for high hub applications and for wind turbines located in wind farms having challenging logistic requirements. For example, transporting the tubular tower sections to the site can be challenging because the sections can be twenty plus meters long and over four meters in diameter. As such, in some instances, a dedicated road is needed, but may not be possible. Accordingly, lattice tower structures may be utilized since they do not experience the same transportation issues.

FIGS. 1 and 2 are perspective views of a plurality of wind turbines 40 having a lattice tower structure 48 known in the art. The wind turbines 40 include a plurality of blades 42 mounted to a rotor hub 44, which in turn is rotationally supported by power generation components housed within a nacelle 46, as is well known in the art. The nacelle 46 is supported atop the lattice tower structure 48, which in the illustrated embodiments is formed by legs 50, horizontal braces 54, and diagonal braces 52. The legs 50 are typically angle iron members or pipe members, and the braces 52, 54 are typically angle iron members. The vertical supports (legs 50) are typically provided for bending loads, whereas the cross support-members 52, 54 connect the legs 50 and are typically provided for torsional loads. These lattice frame tower structures 48 are also referred to in the art as "space frame" towers. The lattice tower structure 48 may be fabricated in sections and erected at the wind turbine site. FIG. 3 is a more detailed view of the structural members of the lattice structure tower 48, and particularly illustrates the connection locations between the braces 52, 54 and the legs 50, as well as between aligned sections of the legs 50. Typically, a plurality of bolt connections 60 are utilized at these various connection locations.

In addition, as shown in FIG. 1, it is known in the art to apply a cladding material 56 over the lattice structure 48, which is typically any suitable fabric, such as an architectural fabric designed for harsh weather conditions. The cladding material 56 protects workers and equipment within the tower and provides an aesthetic appearance to the wind turbine 40.

The cladding material 56 is typically wrapped around the lattice tower structure 48 and tensioned by a set of dedicated hardware attached to the structural members. The cladding material 56, however, must be pre-formed and the dedicated hardware must be fabricated, both of which add costs to the lattice tower structure 48. Further, the cladding material 56 may relax over time, thus requiring constant maintenance to maintain the tension in the fabric to prevent wind damage.

In addition, the cladding material 56 covers the bolt connections making them difficult for operators to access. As such, typical lattice towers include more expensive nut inserts or simple pull rivets to provide for easier installation. The nut inserts, however, are expensive, and the pull rivets are not as strong as a nut and bolt configuration. Accordingly, more fasteners are required, which increase the costs of the tower.

Accordingly, an improved lattice tower covering for a wind turbine that addresses the aforementioned problems would be desired in the art.

BRIEF DESCRIPTION OF THE INVENTION

Aspects and advantages of the invention will be set forth in part in the following description, or may be obvious from the description, or may be learned through practice of the invention.

In accordance with aspects of the invention, a lattice tower assembly for a wind turbine is disclosed. The lattice tower assembly includes a plurality of structural members connected together to define an open lattice tower. The structural members include a plurality of supports, a plurality of inner cross-support members, and a plurality of outer cross-support members. The inner and outer cross-support members are connected between the supports so as to define one or more openings. In addition, the lattice tower assembly includes a lattice tower covering having one or more panel elements. Each of the panel elements are retained in position between the supports and cover at least a portion of one or more of the openings. Further, the lattice tower covering has a surface area defined by the plurality of supports and the one or more panel elements.

In another embodiment, the plurality of supports may be configured so as to define an internal volume between each of the supports, wherein the panel elements are connected between the supports within the internal volume. In a further embodiment, the internal volume is defined by a height of each of the supports, a distance between the supports, and a width of each of the supports.

In still another embodiment, the panel elements may be sandwiched between the inner and outer cross-support members so as to cover at least a portion of the openings. Alternatively, the panel elements may be coupled between the inner cross-support members, between the outer cross-support members, or both. In still further embodiments, the panel elements may be coupled to one or more of the cross-support members. In yet another embodiment, the one or more panel elements may be spaced apart from the cross-support member or may abut against the cross-support members. In a further embodiment, the panel elements may be configured on an exterior side of the outer cross-support members, an interior side of the inner cross-support members, or a combination thereof.

In still another embodiment, each of the panel elements may have a corrugated profile, a curved profile, a flat profile, or any other suitable profile. In addition, the panel elements may be constructed of any suitable material, including a thermoplastic polymer, a metal, or similar. More specifically, the thermoplastic polymer may include a polycarbonate.

In further embodiments, the lattice tower assembly may also include one or more joints configured to secure the panel elements to the structural members of the lattice tower assembly. For example, the joints may include any of the following joint types: a flat plate joint, a panel-leg joint, a Z-joint, an H-joint, a bolted-joint, a U-shaped joint, or similar.

In another aspect, a lattice tower assembly for a wind turbine is disclosed. The lattice tower assembly includes a plurality of structural members connected together to define an open lattice tower. The structural members may include a plurality of supports, a plurality of inner cross-support members, and a plurality of outer cross-support members. The inner and outer cross-support members are connected between the supports so as to define one or more openings. The lattice tower assembly also includes a lattice tower covering having one or more panel elements coupled between the inner and outer cross-support members. As such, the panel elements are sandwiched between the inner and outer cross-support members so as to cover at least a portion of one or more of the openings.

In another aspect, a lattice tower covering for a lattice tower assembly of a wind turbine is disclosed. The lattice tower assembly typically has a plurality of structural members including a plurality of supports, a plurality of inner cross-support members, and a plurality of outer cross-support members. The lattice tower covering includes a plurality of panel elements configured to cover one or more openings defined by the structural members. Each of the panel elements have a predetermined size and shape configured for a certain location on the lattice tower structure. Further, the panel elements are configured for assembly between the supports such that the panel elements and the supports define a surface area of the lattice tower structure when assembled.

In a further embodiment, the lattice tower covering further includes one or more joints configured to secure each of the panel elements to the lattice tower structure. In another embodiment, the panel elements are configured to be sandwiched between the inner and outer cross-support members so as to cover at least a portion of the one or more openings. In still a further embodiment, the panel elements are configured to be coupled between the inner cross-support members, the outer cross-support members, or a combination thereof. In yet another embodiment, the panel elements are configured to be coupled to one or more of the cross-support members.

In still additional embodiments, the panel elements may include a corrugated profile, a curved profile, a flat profile, or any other suitable profile. Further, the shape of the panel elements may be any suitable shape including one of or a combination of the following shapes: a square, a rectangle, a triangle, a trapezoid, or similar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine with a lattice tower structure including a conventional cladding material;

FIG. 2 illustrates a perspective view of another wind turbine with a lattice tower structure without a cladding material;

FIG. 3 illustrates a detailed perspective view of structural members of a conventional lattice tower of a wind turbine;

DETAILED DESCRIPTION OF THE INVENTION

Figure 4:
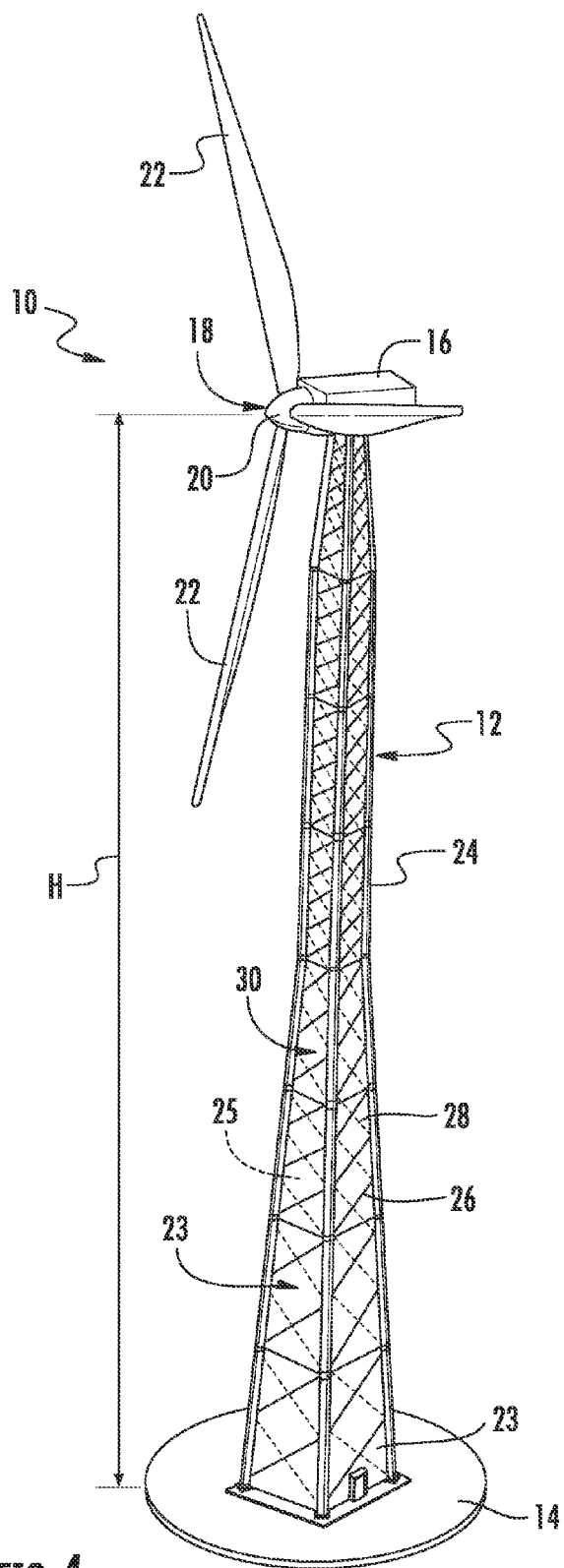
FIG. 4 illustrates a perspective view of one embodiment of a lattice tower assembly according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a lattice tower covering for a lattice tower structure of a wind turbine and a lattice tower assembly including the same. The lattice tower assembly typically includes a plurality of structural members including a plurality of supports or legs, a plurality of inner cross-support members, and a plurality of outer cross-support members. The inner and outer cross-support members are connected between the supports so as to define one or more openings. The lattice tower covering may include one or more panel elements coupled between the supports so as to cover at least a portion of the openings. In one embodiment, the lattice tower covering has a surface area defined by the supports and the panel elements. In a further embodiment, the panel elements may be sandwiched between the inner and outer cross-support members so as to cover at least a portion of the one or more openings. Alternatively, the panel elements may be coupled between the inner cross-support members, the outer cross-support members, or both.

The lattice tower covering and/or assembly of the present disclosure provides various advantages not present in the prior art. For example, the existing legs and cross-support members of the lattice tower may be utilized to support the lattice tower covering. As such, minimal additional hardware is required to install the covering. Further, the covering does not become slack over time like the fabric embodiments of conventional cladding systems; therefore, re-tensioning is not required. In addition, the covering is safer, more secure, bird-proof, and aesthetically more appealing than previous cladding systems. Still further advantages include low maintenance, faster assembly, less repairs, easy access to tower bolt connections, and cheaper installation. For example, in various embodiments, the panel elements are installed such that the bolt connections that join the supports and cross-support members are still accessible to an operator from both sides (i.e. from the exterior of the tower and the interior of the tower). As such, standard nut and bolt configurations may be utilized with the lattice tower assembly, which provide easier installation and less costs than the nut inserts, pull rivets, or similar used in conventional cladding systems. Still further advantages of the lattice tower covering described herein include a covering that leaves the outer surface of the current supports uncovered, thereby requiring less material (i.e. panel elements) to cover the internal components of the tower than previous cladding covers that wrapped around the supports.

Referring now to the drawings, FIGS. 4-7 illustrate various views of one embodiment of a lattice tower covering 30 and/or assembly 12 according to the present disclosure. More specifically, FIG. 4 illustrates a perspective view of one embodiment of a wind turbine 10 including the lattice tower covering 30 of the present disclosure. As shown, the wind turbine 10 includes the tower assembly 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 positioned within the nacelle 16 to permit electrical energy to be produced.

As shown in the illustrated embodiments, the lattice tower assembly 12 of the wind turbine 10 includes supports or legs 24, inner cross-support members 28, outer cross-support members 26, and the lattice tower covering 30. The supports 24 typically extend in a generally vertical direction from the support surface 14. The inner and outer cross-support members 26, 28 are typically connected between the supports 24 so as to define one or more openings 25. In addition, the lattice tower covering 30 may include one or more panel elements 23 configured to cover one or more of the openings 25. Further, in various embodiments, each of the panel elements 23 may have a predetermined size and/or shape configured for a certain location on the lattice tower structure 12. For example, as shown in FIG. 4, the panel elements 23 towards the bottom of the tower 12 are larger than the panel elements 30 at the top of the tower 12. As such, various coverings 30 can be designed according to specific dimensions of multiple wind turbine towers. Accordingly, the coverings 30 may be retrofitted to existing lattice tower structures.

Figure 5:
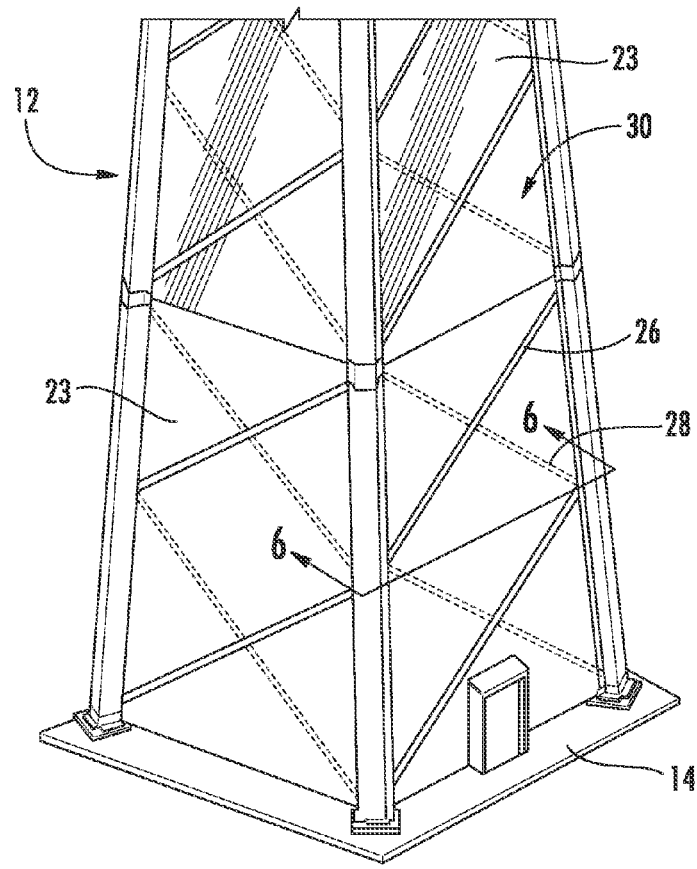
FIG. 5 illustrates a detailed perspective view of a portion of the embodiment of FIG. 4.

Still referring to FIGS. 4 and 5, each of the panel elements 23 may be retained in position between the supports 24 so as to cover at least a portion of one or more of the openings 25. More specifically, in one embodiment, the panel elements 23 may be retained solely between the supports 24 such that the panel elements 23 do not cover the supports 24. In such an embodiment, any loads experienced by the panel elements 23 are transmitted through the supports 24, rather than adjacent panel elements 23. It should be understood that each of the panel elements 23 may be retained in position between the supports 24 by being coupled to the supports 24, to the cross-support members 26, 28, or to each other.

In additional embodiments, the lattice tower covering 30 has a surface area defined by the plurality of supports 24 and the one or more panel elements 23. More specifically, in one embodiment, the surface area of the covering 30 is the total area of the exterior surfaces of the covering 30, including the exterior surfaces of the supports 24 and the panel elements 23. In other words, when the panel elements 23 cover the openings 25, thereby leaving the supports 24 exposed, the surface area of the covering 30 includes the exterior surfaces of the supports 24 and the panel elements 23. Such a configuration saves material and utilizes existing hardware of the lattice tower assembly 12. Alternatively, in another embodiment, the panel elements 23 may be configured to cover the supports 24 such that the surface area is defined by the exterior surfaces of the panel elements 23 only.

Figure 6:
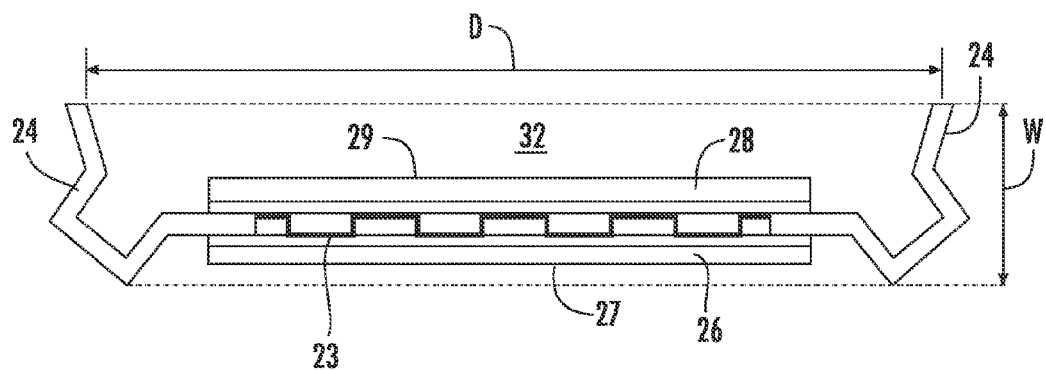
FIG. 6 illustrates a cross-sectional view of the embodiment of FIG. 5 along line 6-6.

Referring now to FIG. 6, the supports 24 may be configured so as to define an internal volume 32 between each of the supports 24. More specifically, FIG. 6 illustrates a cross-sectional view of the embodiment of FIG. 5 along line 6-6 is illustrated. In the illustrated embodiment, the internal volume 32 is defined by a height H of each of the supports 24 (FIG. 4), a distance D between the supports 24, and a width W of each of the supports 24. As such, in one embodiment, the panel elements 23 may be connected between the supports 24 within the internal volume 32 so as to cover at least a portion of the one or more openings 25. Alternatively, the panel elements 23 may extend outside of the internal volume 32 defined by the supports 24.

Referring specifically to FIGS. 4-7, in the illustrated embodiments, the panel elements 23 may be sandwiched between the inner and outer cross-support members 26, 28 so as to cover at least a portion of the one or more openings 25. As such, the structural members of the lattice tower assembly 12 support the panel elements 23. Accordingly, the lattice tower covering 30 remains in place and no tightening is required after installation. In such an embodiment, the panel elements 23 may be installed utilizing a variety of techniques. For example, the supports 24 and the inner cross-support members 28 can be installed first, then the panel elements 23 can be installed between the supports 24, then the outer cross-support members 26 can be installed atop the panel elements 23 to secure the lattice tower covering 30. Alternatively, the supports 24 and the inner and outer cross-support members 26, 28 can be installed first, then the panel elements 23 can be inserted between the inner and outer cross-support members 26, 28 to secure the lattice tower covering 30. In either instance, the panel elements 23 may be coupled to the inner or outer cross-support members 26, 28 or may only be coupled to the supports 24.

Figure 8:
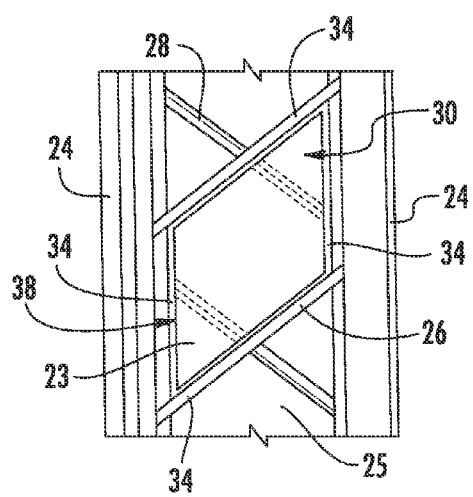
FIG. 8 illustrates a detailed perspective view of another embodiment of a lattice tower assembly according to the present disclosure.
Figure 9:
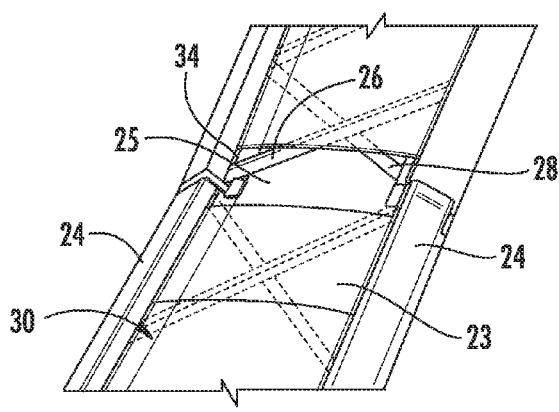
FIG. 9 illustrates a detailed perspective view of another embodiment of a lattice tower assembly according to the present disclosure.

Referring now to FIGS. 8 and 9, further embodiments of the lattice tower assembly 12 according to the present disclosure are illustrated. For example, referring particularly to the embodiment of FIG. 8, the panel elements 23 may also be coupled between two outer cross-support members 26 on an exterior side of the lattice tower assembly 12. More specifically, the panel elements 23 may be configured on an exterior side 27 of the outer cross-support members 26 as shown. Alternatively, the panel elements 23 may be coupled between two the inner cross-support members 28 on an interior side of the lattice tower assembly 12. More specifically, the panel elements 23 may be configured on an interior side 29 of the inner cross-support members 28. In still further embodiments, a portion of the panel elements 23 may be coupled between the inner cross-support members 28 and a portion of the panel elements 23 may be coupled between the outer cross-support members 26.

In the illustrated embodiment, the panel element 23 is assembled in a frame 38, similar to that of a window frame, before it is bolted to the supports 24 and/or the cross-support members 26, 28. As discussed in more detail below, the frame 38 may include one or more joints 34 for connecting the panel element 23 to the supports 24 and/or the cross-support members 26, 28.

Still referring to FIGS. 8 and 9, the panel elements 23 may be spaced apart from the cross-support members 26, 28 or may be coupled to the cross-support members 26, 28. For example, as shown in FIG. 8, the panel element 23 is coupled to the outer cross-support member 26. In contrast, as shown in FIG. 9, the panel elements 23 are coupled only to the supports 24 and are spaced apart from the cross-support members 26, 28.

Referring back to FIG. 6, the panel elements 23 may have any suitable profile or cross-sectional shape. For example, as shown, the panel element 23 has a corrugated profile. In still further embodiments, the panel elements 23 may have a flat or smooth profile or a curved profile (FIG. 9). As used herein, the term "corrugated profile" is meant to encompass any profile having alternating grooves or ridges, wherein the ridges or grooves may have any suitable shape. For example, as shown, the corrugated profile has substantially rectangular grooves. The curved or arcuate profile may be pre-formed in the panel element 23 or may be a product of installation between the supports 24. For example, as shown in FIG. 9, the panel elements 23 may have a substantially flat profile before installation, but due to the flexible material of the panel elements 23 may flex to a curved profile after installation.

Figure 7:
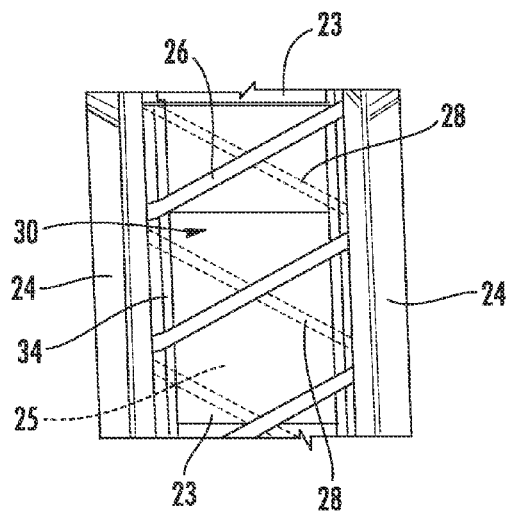
FIG. 7 illustrates a detailed perspective view of another embodiment of a lattice tower assembly according to the present disclosure.

In addition, the panel elements may be any suitable shape. For example, as shown in FIGS. 4 and 5, the panel elements 30 have a generally trapezoidal shape. In further embodiments, as shown in FIG. 7, the panel elements 30 have a generally rectangular shape. In still further embodiments, the shape the panel elements 30 may be any of the following shapes: a square, a rectangle, a triangle, a trapezoid, a circle, an oval, a parallelogram, or similar. Moreover, each of the panel elements 30 may each have the same shape or may each have a different shape.

It should also be understood that the panel elements 23 as described herein may be installed using any suitable hardware or materials. For example, the panel elements 23 may be installed using entirely existing hardware of the lattice tower assembly 12. In addition, the panel elements 23 may be installed using various joint configurations. For example, as shown in FIGS. 7-9, the joints 34 may be configured between one or more panel elements 23 or the panel elements 23 and other various components of the lattice tower assembly 12. More specifically, as shown in FIGS. 7 and 9, the joints 34 may be configured between the panel elements 23 and the supports 24. Further, as shown in FIG. 8, the joints 34 may be configured between the panel elements 23 and the outer cross-support members 26. In still further embodiments, the joints 34 may be configured between the panel elements 23 and any other components of the lattice tower assembly 12.

Figure 10:
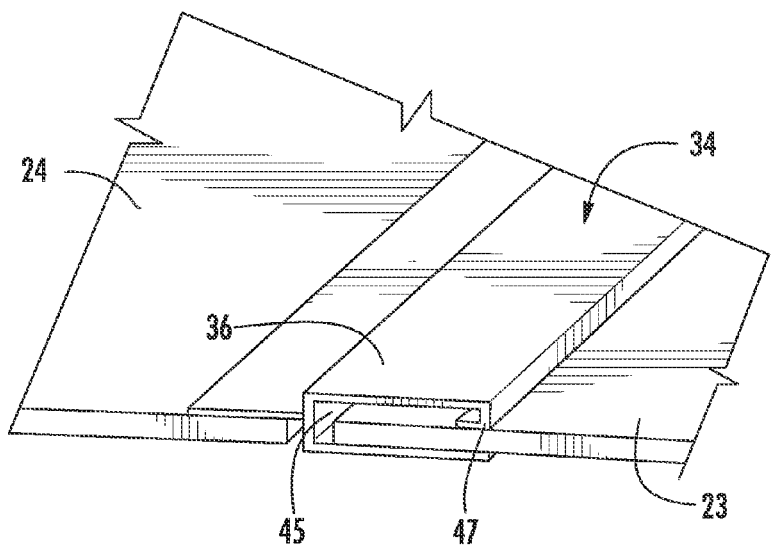
FIG. 10 illustrates a perspective view of one embodiment of joint for a lattice tower assembly according to the present disclosure.
Figure 11:
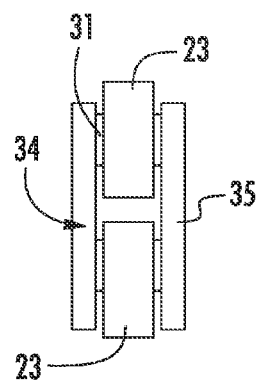
FIG. 11 illustrates a cross-sectional view of another embodiment of a joint for a lattice tower assembly according to the present disclosure.
Figure 12:
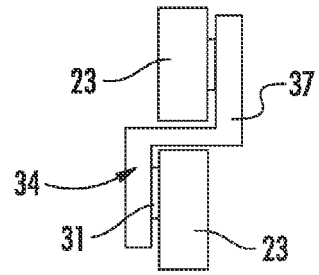
FIG. 12 illustrates a cross-sectional view of another embodiment of a joint for a lattice tower assembly according to the present disclosure; and, FIG. 13 illustrates a cross-sectional view of another embodiment of a joint for a lattice tower assembly according to the present disclosure.

Referring now to FIGS. 10-13, various joint configurations for coupling and/or securing the panel elements 23 to the lattice tower assembly 12 are illustrated. For example, as shown in FIG. 10, a panel-leg joint 36 is illustrated. As shown, the panel-leg joint 36 includes a cavity 45 an overhang 47 that secures the panel element 23. In addition, the overhang 47 can act as a spring against the panel element 23, thereby allowing the panel element 23 to expand. Further, as shown in FIG. 11, a flat-plate joint 36 is illustrated. The flat-plate joint 36 typically consists of at least two flat plates that sandwich joined components (e.g. two panel elements 23) secured with adhesive or tape 31. Moreover, FIG. 12 illustrates a Z-joint 37. The Z-joint 37 typically connects the joined components by connecting to a first side of a first component via tape 31 and connecting to an opposite side of a second component via tape 31. As such, the joint 37 is generally shaped to correspond to a "Z," as shown in FIG. 12.

Figure 13:
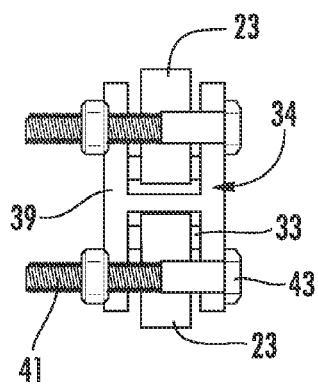

In still another embodiment, the joint 34 may be an H-joint 39. For example, as shown in FIG. 13, two panel elements 23 are inserted into opposing sections of the "H" and bolted therein using one or more fasteners. For example, as shown, the fasteners include a plurality of bolts 41 and nuts 43. In further embodiments, the fasteners may include one or more rivets. Such an embodiment provides numerous advantages. For example, installation of the panel elements 23 using rivets can be completed on the exterior of the tower 12 without requiring access to the interior of the tower 12. The H-joint may also include seals 33 within corresponding "H" sections.

In yet a further embodiment, the joints 34 may be U-shaped joints. For example, as shown in FIG. 9, a plurality of longitudinal U-shaped joints are attached to the supports 24 so as to receive the panel elements 23 therein. It should also be understood that the joints 34 described herein are not intended to limit the scope of the present disclosure and are provided for example only. As such, the present disclosure may include any suitable joint known in the art.

The panel elements 23 described herein may also be constructed of any suitable material known in the art. For example, in one embodiment, the panel elements 23 may be fabricated of a thermoplastic polymer or a metal. More specifically, the thermoplastic polymer may include a polycarbonate. Polycarbonate panel elements 23 may be configured to provide a light-weight but virtually unbreakable covering for the lattice tower assembly 12. In addition, in various embodiments, the panel elements 23, whether constructed of polycarbonate or another suitable material, may be UV resistant, flame retardant, light weight, resistive to impact, flexible, and/or any other desired characteristics. Further, each of the panel elements 23 may be constructed of similar materials or may be each constructed of different materials. For example, as shown in FIGS. 4 and 5, a portion of the lattice tower covering 30 includes metal panel elements 23 and a portion of the lattice tower covering includes polycarbonate panel elements 23.

In still further embodiments, the lattice tower assembly 12 may be fabricated in sections and erected at the wind turbine site. As such, the panel elements 23 may be installed within each section before the tower 12 is assembled to reduce and/or eliminate uptower installation of the covering 30. Alternatively, the panel elements 23 may be installed after the sections have been installed to the support surface 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lattice tower assembly for a wind turbine, the lattice tower assembly comprising:
   a plurality of structural members connected together to define an open lattice tower, the structural members comprising a plurality of supports, a plurality of inner cross-support members, and a plurality of outer cross-support members, the inner and outer cross-support members being connected between the supports so as to define one or more openings, wherein each of the inner cross-support members overlaps one of the outer cross-support members; and, a lattice tower covering comprising one or more panel elements, each of the panel elements sandwiched between overlapping inner and outer cross-support members, wherein the panel elements are configured to cover at least a portion of one or more of the openings, and wherein the lattice tower covering comprises a surface area defined by the plurality of supports and the one or more panel elements.

2. The lattice tower assembly of claim 1, wherein the plurality of supports are configured so as to define an internal volume between each of the supports, wherein the panel elements are connected between the supports within the internal volume.

3. The lattice tower assembly of claim 2, wherein the internal volume is defined by a height of each of the supports, a distance between the supports, and a width of each of the supports.

4. The lattice tower assembly of claim 1, wherein the one or more panel elements are coupled to one or more of the cross-support members.

5. The lattice tower assembly of claim 1, wherein each of the one or more panel elements comprise one of a corrugated profile, a curved profile, or a flat profile.

6. The lattice tower assembly of claim 1, wherein the one or more panel elements are constructed of one of or a combination of a thermoplastic polymer or a metal, wherein the thermoplastic polymer comprises a polycarbonate.

7. The lattice tower assembly of claim 1, further comprising one or more joints configured to secure the panel elements to the lattice tower assembly.

8. The lattice tower assembly of claim 7, wherein the one or more joints further comprise at least one of a flat plate joint, a panel-leg joint, a Z-joint, an H-joint, a bolted-joint, or a U-shaped joint.

* * * * *